(12) United States Patent
Zhu

(10) Patent No.: US 10,585,301 B2
(45) Date of Patent: Mar. 10, 2020

(54) VIEWING ANGLE SWITCHING STRUCTURE, DISPLAY DEVICE AND VIEWING ANGLE SWITCHING METHOD THEREOF

(71) Applicants: BOE TECHNOLOGY GROUP CO., LTD., Beijing (CN); ORDOS YUANSHENG OPTOELECTRONICS CO., LTD., Inner Mongolia (CN)

(72) Inventor: Jianchao Zhu, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 8 days.

(21) Appl. No.: 15/995,999

(22) Filed: Jun. 1, 2018

(65) Prior Publication Data
US 2019/0171047 A1    Jun. 6, 2019

(30) Foreign Application Priority Data

Dec. 1, 2017    (CN) .......................... 2017 1 1250152

(51) Int. Cl.
| | |
|---|---|
| *G02F 1/13* | (2006.01) |
| *G09G 3/3208* | (2016.01) |
| *G09G 3/34* | (2006.01) |
| *G02B 26/00* | (2006.01) |

(52) U.S. Cl.
CPC ......... *G02F 1/1323* (2013.01); *G02B 26/004* (2013.01); *G09G 3/3208* (2013.01); *G09G 3/34* (2013.01); *G09G 2320/068* (2013.01)

(58) Field of Classification Search
None
See application file for complete search history.

(56) References Cited

U.S. PATENT DOCUMENTS

2017/0018215 A1*    1/2017    Black ...................... G09G 3/02

* cited by examiner

*Primary Examiner* — Duane N Taylor, Jr.
(74) *Attorney, Agent, or Firm* — Brooks Kushman P.C.

(57) ABSTRACT

The present disclosure provides a viewing angle switching structure, a display device and a viewing angle switching method. The viewing angle switching structure includes a plurality of viewing angle switching units corresponding to pixels on a display panel. Each viewing angle switching unit includes: an accommodation cavity; a first solution layer and a second solution layer in the accommodation cavity, a liquid interface being formed between the first and the second solution layers; and an electric field driving unit configured to generate a driving electric field to be applied to the accommodation cavity. The first solution layer has a refractive index different from the second solution layer. The first solution layer includes a transparent conductive solution and the second solution layer includes a transparent non-conductive solution. A shape of the liquid interface between the first and the second solution layers is changeable under the effect of the driving electric field.

12 Claims, 1 Drawing Sheet

VIEWING ANGLE SWITCHING STRUCTURE, DISPLAY DEVICE AND VIEWING ANGLE SWITCHING METHOD THEREOF

CROSS-REFERENCE TO RELATED APPLICATION

This application claims priority to Chinese Patent Application No. 201711250152.7 filed on Dec. 1, 2017, which is incorporated herein by reference in its entirety.

TECHNICAL FIELD

The present disclosure relates to the field of display technology, in particular to a viewing angle switching structure, a display device and a viewing angle switching method thereof.

BACKGROUND

Along with the development of the communication technology, such functions as entertainment, reading and office may be achieved through mobile phones, and a user may read a document or view a photo or video on a mobile terminal at any time and any place. However, in a crowded environment, e.g., subway, bus or restaurant, the content displayed on the mobile phone of the user may probably be viewed by any other person around the user, resulting in the leakage of privacy information.

Usually, it is impossible for a display device such as mobile phone to adjust its viewing angle through configuration. Instead, the viewing angle is controlled through a protection film attached onto a screen thereof, so it is necessary to maintain the protection film. In addition, the viewing angle is fixed, and cannot be adjusted.

SUMMARY

In one aspect, the present disclosure provides in some embodiments a viewing angle switching structure for use in a display panel including a plurality of pixels. The viewing angle switching structure includes a plurality of viewing angle switching units corresponding to the pixels on the display panel. Each viewing angle switching unit includes: an accommodation cavity; a first solution layer and a second solution layer in the accommodation cavity, a liquid interface being formed between the first solution layer and the second solution layer; and an electric field driving unit configured to generate a driving electric field to be applied to the accommodation cavity. The first solution layer has a refractive index different from the second solution layer. The first solution layer includes a transparent conductive solution and the second solution layer includes a transparent non-conductive solution. A shape of the liquid interface between the first solution layer and the second solution layer is capable of being changed under the effect of the driving electric field.

In a possible embodiment of the present disclosure, the electric field driving unit includes a first transparent electrode and a second transparent electrode arranged opposite to each other, the first solution layer and the second solution layer are arranged between the first transparent electrode and the second transparent electrode, and the shape of the liquid interface between the first solution layer and the second solution layer is capable of being changed under the control of voltages applied to the first transparent electrode and the second transparent electrode.

In a possible embodiment of the present disclosure, an insulative barrier layer is arranged between the first transparent electrode and the second transparent electrode, and provided with an opening region corresponding to the pixels on the display panel so as to form the accommodation cavity with the first transparent electrode and the second transparent electrode.

In a possible embodiment of the present disclosure, a lyophobic or dielectric layer is arranged at a side of at least one of the first transparent electrode and the second transparent electrode facing the other one of the first transparent electrode and the second transparent electrode.

In a possible embodiment of the present disclosure, the first transparent electrode, the lyophobic layer or dielectric layer, the first solution layer, the second solution layer and the second transparent electrode are arranged one on another.

In a possible embodiment of the present disclosure, the first solution layer includes a sodium chloride solution, a potassium sulfate solution or a sodium hydroxide solution, and the second solution layer includes a silicone oil solution.

In a possible embodiment of the present disclosure, the viewing angle switching units correspond to the pixels on the display panel respectively.

In a possible embodiment of the present disclosure, the first transparent electrodes of the plurality of viewing angle switching units are formed into a one-piece surface-like electrode.

In a possible embodiment of the present disclosure, the second transparent electrodes of the plurality of viewing angle switching units are formed into a one-piece surface-like electrode.

In a possible embodiment of the present disclosure, the barrier layers of the plurality of viewing angle switching units are formed into one piece.

In another aspect, the present disclosure provides in some embodiments a display device, including a display panel including a plurality of pixels and the above-mentioned viewing angle switching structure arranged at a light-exiting side of the display panel. Each of viewing angle switching unit of the viewing angle switching structure corresponds to at least one of the pixels.

In a possible embodiment of the present disclosure, the display panel is an organic light-emitting diode (OLED) display panel. The OLED display panel includes a cathode layer, an anode layer arranged opposite to the cathode layer, and an organic light-emitting layer arranged between the cathode layer and the anode layer. The cathode layer serves as the first transparent electrode, and the second transparent electrode is arranged at a side of the cathode layer away from the anode layer.

In yet another aspect, the present disclosure provides in some embodiments a viewing angle switching method for use in the above-mentioned display device, including a step of adjusting an electric field generated by the electric field driving unit, so as to change a shape of the liquid interface between the first solution layer and the second solution layer, thereby to switch a viewing angle of the display device.

In a possible embodiment of the present disclosure, the step of adjusting the electric field generated by the electric field driving unit includes applying a constant voltage to the first transparent electrode and applying an adjustable voltage to the second transparent electrode.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In the related art, a protection film is attached onto a screen of a display device, but the resultant viewing angle is fixed. An object of the present disclosure is to provide a viewing angle switching structure, a display device and a viewing angle switching method, so as to adjust a viewing angle of the display device.

Figure 1:
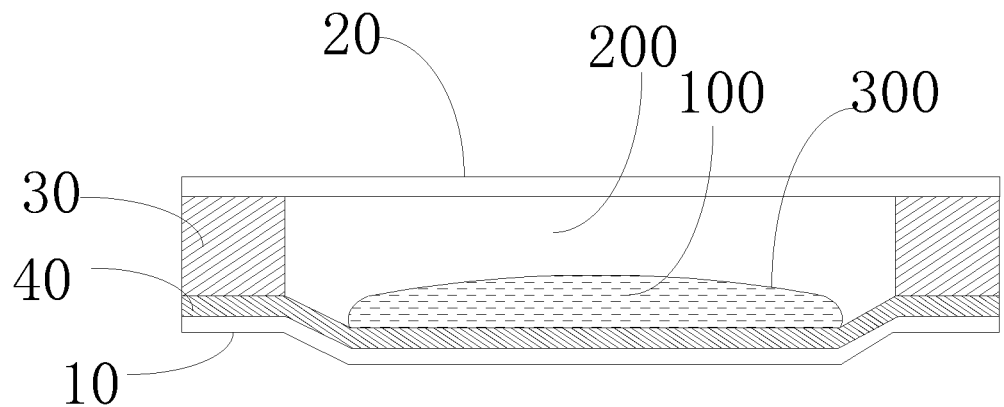
FIG. 1 is a schematic view showing a viewing angle switching structure according to one embodiment of the present disclosure.
Figure 2:
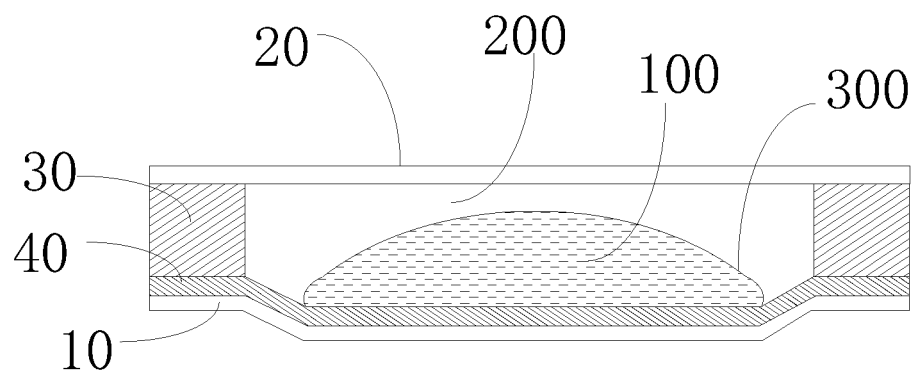
FIG. 2 is another schematic view showing the viewing angle switching structure according to one embodiment of the present disclosure.
Figure 3:
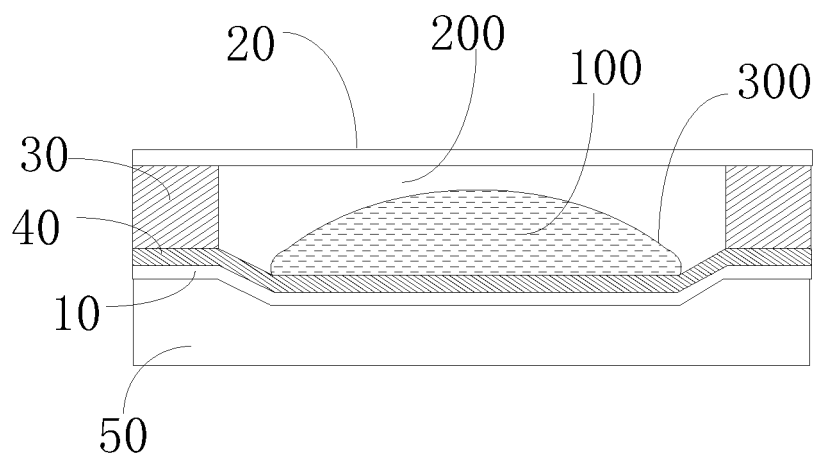
FIG. 3 is a schematic view showing a display device according to one embodiment of the present disclosure.

As shown in FIGS. 1 to 3, the present disclosure provides in some embodiments a viewing angle switching structure for use in a display panel 50 including a plurality of pixels. The viewing angle switching structure includes a plurality of viewing angle switching units corresponding to the pixels on the display panel 50. Each viewing angle switching unit includes: an accommodation cavity; a first solution layer 100 and a second solution layer 200 in the accommodation cavity, a liquid interface 300 being formed between the first solution layer 100 and the second solution layer 200; and an electric field driving unit configured to generate a driving electric field to be applied to the accommodation cavity. The first solution layer 100 has a refractive index different from the second solution layer 200. The first solution layer 100 includes a transparent conductive solution and the second solution layer 200 includes a transparent non-conductive solution. A shape of the liquid interface 300 between the first solution layer 100 and the second solution layer 200 is capable of being changed under the effect of the driving electric field generated by the electric field driving unit.

FIGS. 1 to 3 merely show one viewing angle switching unit. It should be appreciated that, the other viewing angle switching units may have a similar structure and correspond to the pixels.

According to the viewing angle switching structure in the embodiments of the present disclosure, the viewing angle switching units of the viewing angle switching structure may correspond to the pixels on the display panel 50. The first solution layer 100 of each viewing angle switching unit includes the transparent conductive solution and the second solution layer 200 includes the transparent non-conductive solution. Free, charged particles in the transparent conductive solution may move in a certain direction under the effect of the driving electric field. The shape of the liquid interface 300 between the first solution layer 100 and the second solution layer 200 may be changed under the effect of different electric fields. In addition, because the first solution layer 100 has the refractive index different from the second solution layer 200, a light beam from a light-exiting side of the display panel 50 may be transmitted in a different direction after passing through the viewing angle switching unit. As a result, through adjusting the electric field generated by the electric field driving unit, it is able to change the shape of the liquid interface 300 between the first solution layer 100 and the second solution layer 200, thereby to adjust the viewing angle and achieve a peep-proof effect.

It should be appreciated that, the solution of the first solution layer 100 is mutually insoluble with the solution of the second solution layer 200, so as to form the liquid interface 300 therebetween. In addition, the liquid interface 300 between the first solution layer 100 and the second solution layer 200 may be changed between a planar-surface shape and a curved-surface shape, or among different curved-surface shapes having different curvatures.

In a possible embodiment of the present disclosure, as shown in FIGS. 1 and 2, under the effect of the electric field generated by the electric field driving unit, a middle portion of the liquid interface 300 between the first solution layer 100 and the second solution layer 200 is of a convex shape protruding toward the second solution layer 200, so that the viewing angle switching units form a microlens array. Hence, through controlling the electric field, it is able to change the curvature of the convex shape, thereby to adjust the viewing angle.

Taking the display device in FIG. 3 as an example, the viewing angle adjustment structure is arranged at a light-exiting side of the display panel 50, the first solution layer 100 is arranged at a side of the viewing angle adjustment structure adjacent to the display panel, the second solution layer is arranged at a side of the viewing angle adjustment structure away from the display panel, and the liquid interface 300 is of a convex shape protruding toward the second solution layer 200. In the case that the first solution layer 100 has a refractive index greater than the second solution layer 200 and the curvature of the convex shape increases after controlling the electric field generated by the electric field driving unit, it is able to decrease the viewing angle of the display device, and in the case that the curvature of the convex shape decreases, it is able to increase the viewing angle of the display device.

In contrast, in the case that the refractive index of the first solution 100 is smaller than the second solution layer 200 and the curvature of the convex shape increases, it is able to increase the viewing angle of the display device, and in the case that the curvature of the convex shape decreases, it is able to decrease the viewing angle of the display device.

It should be appreciated that, under the effect of the electric field generated by the electric field driving unit, the middle portion of the liquid interface 300 between the first solution layer 100 and the second solution layer 200 may also be of a concave shape depressed toward the first solution layer 100, so that the viewing angle switching units form a microlens array. It should be further appreciated that, in a possible embodiment of the present disclosure, the viewing angle switching units may correspond to the pixels on the display panel respectively. In actual use, each viewing angle switching unit may also correspond to more than one pixels.

The viewing angle switching structure will be described hereinafter in conjunction with the embodiments.

As shown in FIGS. 1 and 2, the electric field driving unit includes a first transparent electrode 10 and a second transparent electrode 20 arranged opposite to each other. The first solution layer 100 and the second solution layer 200 are arranged between the first transparent electrode 10 and the second transparent electrode 20. In the case that a voltage applied to each of the first transparent electrode 10 and the second transparent electrode 20 changes, the shape of the liquid interface 300 between the first solution layer 100 and the second solution layer 200 may change too.

Based on the above, the electric field driving unit is implemented by the first transparent electrode 10 and the second transparent electrode 20 arranged opposite to each other. This structure is simple and capable of being implemented conveniently. It should be appreciated that, in actual use, the electric field driving unit may be implemented in any other modes, as long as the driving electric field may be generated and applied to the accommodation cavity.

In addition, as shown in FIGS. 1 and 2, an insulative barrier layer 30 is arranged between the first transparent electrode 10 and the second transparent electrode 20, and provided with an opening region corresponding to the pixels on the display panel 50 so as to form the accommodation cavity with the first transparent electrode 10 and the second transparent electrode 20.

Based on the above, the barrier layer 30 may form a cell-like structure with the first transparent electrode 10 and the second transparent electrode 20 through the opening region corresponding to the pixels on the display panel 50, and the first solution layer 100 and the second solution layer 200 may be filled into the cell-like structure. Through the barrier layer 30, it is able to, on one hand, separate the first transparent electrode 10 from the second transparent electrode 20 by a certain distance, and on the other hand separate solutions within two adjacent viewing angle switching units from each other, so as to enable each viewing angle switching unit to form a lens structure individually.

It should be appreciated that, the first transparent electrodes 10 of all the viewing angle switching units may be formed into a one-piece surface-like electrode, and identically, the second transparent electrodes 20 of all the viewing angle switching units may be formed into a one-piece surface-like electrode too. In this way, it is able to control the shapes of the liquid interfaces 300 in all the viewing angle switching units simultaneously. In actual use, in accordance with the practical need, merely the first transparent electrodes 10 or the second transparent electrodes 20 of some viewing angle switching units may be formed into a one-piece surface-like electrode.

It should be further appreciated that, the barrier layers 30 of the viewing angle switching units may be formed integrally. To be specific, an insulation material may be applied onto the first transparent electrode 10 or the second transparent electrode 20 so as to form the barrier layer, and then a portion of the barrier layer corresponding to a pixel region of the display panel 50 may be etched off, so as to form the opening region.

In addition, as shown in FIGS. 1 and 2, a lyophobic or dielectric layer 40 is arranged at a side of at least one of the first transparent electrode 10 and the second transparent electrode 20 facing the other one of the first transparent electrode 10 and the second transparent electrode 20.

In a possible embodiment of the present disclosure, the first solution layer 100 is arranged adjacent to the first transparent electrode 10, the second solution layer 200 is arranged adjacent to the second transparent electrode 20, and the lyophobic or dielectric layer 40 is arranged on the first transparent electrode 10. It should be appreciated that, the lyophobic or dielectric layer 40 may also be arranged on the second transparent electrode 20.

It should be further appreciated that, the first solution layer 100 may include, but not limited to, a sodium chloride solution, a potassium sulfate solution or a sodium hydroxide solution, and the second solution layer 200 may include, but not limited to, a silicone oil solution.

The present disclosure further provides in some embodiments a method for manufacturing the viewing angle switching structure, which includes the following steps.

Step S1: forming the first transparent electrode 10 on the display panel 50.

Step S2: forming the lyophobic or dielectric layer 40 on the first transparent electrode 10.

Step S3: forming the barrier layer 30 on the lyophobic or dielectric layer 40. The barrier layer 30 may be provided with an opening region.

Step S4: filling a transparent conductive solution into the opening region of the barrier layer 30, so as to form the first solution layer 100. Due to the lyophobic or dielectric layer 40, a surface of the first solution layer 100 may be provided with a curved-surface shape as shown in FIG. 1.

Step S5: filling a transparent non-conductive solution into the opening region of the barrier layer 30, so as to form the second solution layer 200 covering the first solution layer 100.

Step S6: forming the second transparent electrode 20 on the barrier layer 30 so as to cover the opening region of the barrier layer 30.

The present disclosure further provides in some embodiments a display device including the display panel 50 and the above-mentioned viewing angle switching structure. The viewing angle switching structure is arranged at a light-exiting side of the display panel 50. The display panel 50 includes a plurality of pixels, and each viewing angle switching unit of the viewing angle switching structure corresponds to at least one pixel.

According to the display device in the embodiments of the present disclosure, the viewing angle switching structure is arranged on the display panel 50, and the viewing angle switching units of the viewing angle switching structure correspond to the pixels on the display panel 50 (e.g., the viewing angle switching units correspond to the pixels respectively). The first solution layer 100 of each viewing angle switching unit includes the transparent conductive solution and the second solution layer 200 includes the transparent non-conductive solution. Free, charged particles in the transparent conductive solution may move in a certain direction under the effect of the driving electric field. The shape of the liquid interface 300 between the first solution layer 100 and the second solution layer 200 may be changed under the effect of different electric fields. In addition, because the first solution layer 100 has the refractive index different from the second solution layer 200, a light beam from a light-exiting side of the display panel 50 may be transmitted in a different direction after passing through the viewing angle switching unit. As a result, through adjusting the electric field generated by the electric field driving unit, it is able to change the shape of the liquid interface 300 between the first solution layer 100 and the second solution layer 200, thereby to adjust the viewing angle and achieve a peep-proof effect.

As shown in FIGS. 1 to 3, the display panel 50 includes a display surface on which the viewing angle switching structure is arranged.

Based on the above, the viewing angle switching structure may be formed on the display surface of the display panel 50 after the formation of the display panel 50. The display panel 50 may be an organic light-emitting diode (OLED) display panel or a liquid crystal display panel. It should be appreciated that, the viewing angle switching structure may also be formed within the display panel 50 and at a position adjacent to the light-exiting side of the display panel 50.

In a possible embodiment of the present disclosure, the display panel 50 is an OLED display panel which includes a cathode layer, an anode layer arranged opposite to the cathode layer, and an organic light-emitting layer arranged between the cathode layer and the anode layer. The cathode layer serves as the first transparent electrode 10, and the second transparent electrode 20 is arranged at a side of the cathode layer away from the anode layer.

As mentioned above, the cathode layer of the OLED display panel 50 may be directly used as the first transparent electrode 10 of the viewing angle switching structure, so as to simplify the structure and the manufacture process and facilitate a switching control operation.

In addition, a constant voltage is applied to the cathode layer, so it is merely necessary to adjust a voltage applied to the second transparent electrode 20, so as to change the change of the liquid interface 300 between the first solution layer 100 and the second solution layer 200 (FIGS. 1 and 2 show the liquid interface 300 with different curvatures in the case that different voltages are applied to the second transparent electrode 20). As a result, it is able for the light beam from an OLED to be transmitted in a different direction after passing through a microlens formed by the first solution layer 100 and the second solution layer 200, thereby to adjust the viewing angle.

It should be appreciated that, in actual use, each of the first transparent electrode 10 and the second transparent electrode 20 may also be formed on the display panel individually.

The present disclosure further provides in some embodiments a viewing angle switching method for use in the above-mentioned display device. The viewing angle switching method includes a step of adjusting an electric field generated by the electric field driving unit, so as to change a shape of the liquid interface 300 between the first solution layer 100 and the second solution layer 200, thereby to switch a viewing angle of the display device.

In a possible embodiment of the present disclosure, the step of adjusting the electric field generated by the electric field driving unit includes applying a constant voltage to the first transparent electrode 10 and applying an adjustable voltage to the second transparent electrode 20, so as to change the shape of the liquid interface 300 between the first solution layer 100 and the second solution layer 200, thereby to adjust the viewing angle of the display device.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A viewing angle switching structure for use in a display panel comprising a plurality of pixels, wherein the viewing angle switching structure comprises a plurality of viewing angle switching units corresponding to the pixels on the display panel,
   wherein each viewing angle switching unit comprises:
   an accommodation cavity;
   a first solution layer and a second solution layer in the accommodation cavity, a liquid interface being formed between the first solution layer and the second solution layer; and
   a first transparent electrode and a second transparent electrode arranged opposite to each other,
   wherein the first solution layer has a refractive index different from the second solution layer,
   the first solution layer comprises a transparent conductive solution and the second solution layer includes a transparent non-conductive solution, and
   a shape of the liquid interface between the first solution layer and the second solution layer is capable of being changed under the control of voltages applied to the first transparent electrode and the second transparent electrode;
   wherein an insulative barrier layer is arranged between the first transparent electrode and the second transparent electrode, and provided with an opening region corresponding to the pixels on the display panel to form the accommodation cavity with the first transparent electrode and the second transparent electrode; and
   the barrier layer of the plurality of viewing angle switching units is formed into one piece.

2. The viewing angle switching structure according to claim 1, wherein the first solution layer and the second solution layer are arranged between the first transparent electrode and the second transparent electrode.

3. The viewing angle switching structure according to claim 2, wherein a lyophobic or dielectric layer is arranged at a side of at least one of the first transparent electrode and the second transparent electrode facing the other one of the first transparent electrode and the second transparent electrode.

4. The viewing angle switching structure according to claim 3, wherein the first transparent electrode, the lyophobic layer or dielectric layer, the first solution layer, the second solution layer and the second transparent electrode are arranged one on another.

5. The viewing angle switching structure according to claim 1, wherein the first solution layer comprises a sodium chloride solution, a potassium sulfate solution or a sodium hydroxide solution, and the second solution layer comprises a silicone oil solution.

6. The viewing angle switching structure according to claim 1, wherein the viewing angle switching units correspond to the pixels on the display panel respectively.

7. The viewing angle switching structure according to claim 2, wherein the first transparent electrodes of the plurality of viewing angle switching units are formed into a one-piece surface-like electrode.

8. The viewing angle switching structure according to claim 2, wherein the second transparent electrodes of the plurality of viewing angle switching units are formed into a one-piece surface-like electrode.

9. A display device, comprising a display panel and the viewing angle switching structure according to claim 1, wherein the viewing angle switching structure is arranged at a light-exiting side of the display panel, the display panel comprises a plurality of pixels, and each viewing angle switching unit of the viewing angle switching structure corresponds to at least one pixel.

10. The display device according to claim 9, wherein the viewing angle switching structure comprises a first transparent electrode and a second transparent electrode arranged opposite to each other, the first solution layer and the second solution layer are arranged between the first transparent electrode and the second transparent electrode, and the shape of the liquid interface between the first solution layer and the second solution layer is capable of being changed under the control of voltages applied to the first transparent electrode and the second transparent electrode;

the display panel is an organic light-emitting diode (OLED) display panel comprising a cathode layer, an anode layer arranged opposite to the cathode layer, and an organic light-emitting layer arranged between the cathode layer and the anode layer; and the cathode layer serves as the first transparent electrode, and the second transparent electrode is arranged at a side of the cathode layer away from the anode layer.

11. A viewing angle switching method for use in the display device according to claim 9, comprising:

adjusting the voltages applied to the first transparent electrode and the second transparent electrode to change a shape of the liquid interface between the first solution layer and the second solution layer, thereby to switch a viewing angle of the display device.

12. The viewing angle switching method according to claim 11, wherein the viewing angle switching structure comprises a first transparent electrode and a second transparent electrode arranged opposite to each other, the first solution layer and the second solution layer are arranged between the first transparent electrode and the second transparent electrode, and the shape of the liquid interface between the first solution layer and the second solution layer is capable of being changed under the control of voltages applied to the first transparent electrode and the second transparent electrode, the display panel is an organic light-emitting diode (OLED) display panel comprising a cathode layer, an anode layer arranged opposite to the cathode layer, and an organic light-emitting layer arranged between the cathode layer and the anode layer; the cathode layer serves as the first transparent electrode, and the second transparent electrode is arranged at a side of the cathode layer away from the anode layer, wherein the step of adjusting the voltages applied to the first transparent electrode and the second transparent electrode comprises applying a constant voltage to the first transparent electrode and applying an adjustable voltage to the second transparent electrode.

* * * * *